United States Patent [19]

Balmer

[11] 4,274,736
[45] Jun. 23, 1981

[54] METHOD AND APPARATUS FOR ELECTROOPTICAL DISTANCE MEASUREMENT

[75] Inventor: Beat Balmer, Unterkulm, Switzerland

[73] Assignee: Kern & Co. AG, Aarau, Switzerland

[21] Appl. No.: 79,102

[22] Filed: Sep. 26, 1979

[30] Foreign Application Priority Data

Oct. 11, 1978 [CH] Switzerland ................. 10573/78

[51] Int. Cl.³ .............................................. G01C 3/08
[52] U.S. Cl. .................................... 356/5; 343/7 A; 343/12 R
[58] Field of Search ................ 343/12 R, 7 A; 356/5

[56] References Cited

U.S. PATENT DOCUMENTS

| 3,508,828 | 4/1970 | Froome et al. | 356/5 |
|---|---|---|---|
| 3,577,144 | 5/1971 | Girault | 356/5 |
| 3,832,056 | 8/1974 | Shipp et al. | 343/12 R |
| 4,077,718 | 3/1978 | Graham, Jr. et al. | 356/5 |
| 4,093,380 | 6/1978 | White | 356/5 |

FOREIGN PATENT DOCUMENTS 596559 3/1978 Switzerland ................. 356/5

OTHER PUBLICATIONS

A. W. Kondraschkow, "Electrooptical Dist. Meas." (German), Berlin, 1961, Veb Verlag für Bauwesen, p. 169; 356-5.

*Primary Examiner*—Stephen C. Buczinski

[57] ABSTRACT

With an electrooptical distance meter a reference signal is timeshifted by means of an electronic phase shifter (20), until it has a given phase relation to the measurement signal. Both signals are compared in phase by a double balanced mixer (22), the output of which directs the electronic phase shifter (20) by a control loop (20, 22, 23). The phase shift is measured after frequency conversion by two additional double balanced mixers (24, 25). Thus handy precision distance meters with measurement frequencies about 500 MHz may be built, comprising control loops for laser diode transmitter (1), avalanche diode receiver (13), phase shifter (20) and intermediate frequency, as well as a processor (5, 29) control for automatic function of the instrument.

17 Claims, 5 Drawing Figures

METHOD AND APPARATUS FOR ELECTROOPTICAL DISTANCE MEASUREMENT

BACKGROUND OF THE INVENTION

1. Field of the Invention

This invention relates in general to electrooptical distance measurement apparatus and method, such as may be used in field and land surveying. A high precision of measurement may be thus achieved for example for observation of movements of buildings or of the earth's crust, although the invention is not to be limited to these particular applications.

2. Description of the Prior Art

The well known electrooptical measurement of distances is based upon the electrical measurement of the time a beam of light needs to traverse the distance to be measured. If the velocity of light propagation is known the distance is obtained by multiplying velocity by time of propagation. With almost all practical applications light signals are transmitted from one end of the distance and then by means of a reflector at the other end the signals are redirected to their origin. For measuring time of propagation the transmitted light beam receives particular marks. A short signal flash or pulse may be used to measure the time of flight directly as known from the pulse methods, whereas with phase method the propagation time is obtained indirectly by measuring the phase shift a continuously modulated beam returning from the reflector has undergone with respect to the outgoing beam.

Phase measurement is done by one of two different methods, namely the analog and the digital one. Analog phase measurement is done with a phase shifter by shifting the unknown phase with respect to the phase of a reference signal until a known phase difference is observed. The necessary phase shift is read from the phase shifter. As known from CH-Patent No. 596 559 a coaxial delay line with adjustable mechanical length may be well used as a phase shifter for modulation frequencies near 500 MHz, the change in length giving a rather precise value of the corresponding phase shift. Unfortunately such a line has turned out to be too large and it cannot be made small enough for use in field surveying.

Other known methods for direct phase measurement at modulation frequencies around 500 MHz have an insufficient precision for a number of applications. For improving performance it is known to frequency-convert high frequencies of up to 15 MHz to a lower frequency by heterodyning with a beat frequency oscillator, and to effect the phase shift and phase measurement as mentioned above with the converted signals (see A. W. Kondraschkow: "Elektrooptische Entfernungsmessung", Berlin, 1961, pages 173 et seq.). For precision distance measurements at frequencies around 500 MHz however this method has likewise proved to be inadequate.

An object of the present invention is, therefore, to provide a method and an apparatus for electrooptical distance measurement which allow sufficient precision and at the same time a miniaturisation convenient for field use.

The foregoing objects, other objects as well as the numerous advantages of the present invention are set forth in the following disclosure.

SUMMARY OF THE PRESENT INVENTION

The present invention comprises a method for electrooptical distance measurement wherein a reference signal, also used for modulation of the measurement light beam, is time-shifted in correspondence with a measurement signal obtained by demodulating said light beam. The distance is found from the extent of said signal shift by frequency-converting and measuring phase shift of the frequency converted reference signals.

An embodiment of an apparatus for electrooptical distance measurement comprises a first double balanced mixer for signal comparison, an electronic phase shifter and two additional double balanced mixers for frequency conversion. A series of different modulating frequencies within the microwave range are selected among the harmonic components of the output of a frequency synthesizer by means of a filter network.

Other objects, features and advantages of the present invention will be apparent from the following detailed description of certain preferred embodiments thereof when taken in conjunction with the accompanying drawings.

DESCRIPTION OF THE PREFERRED EMBODIMENTS

Figure 1:
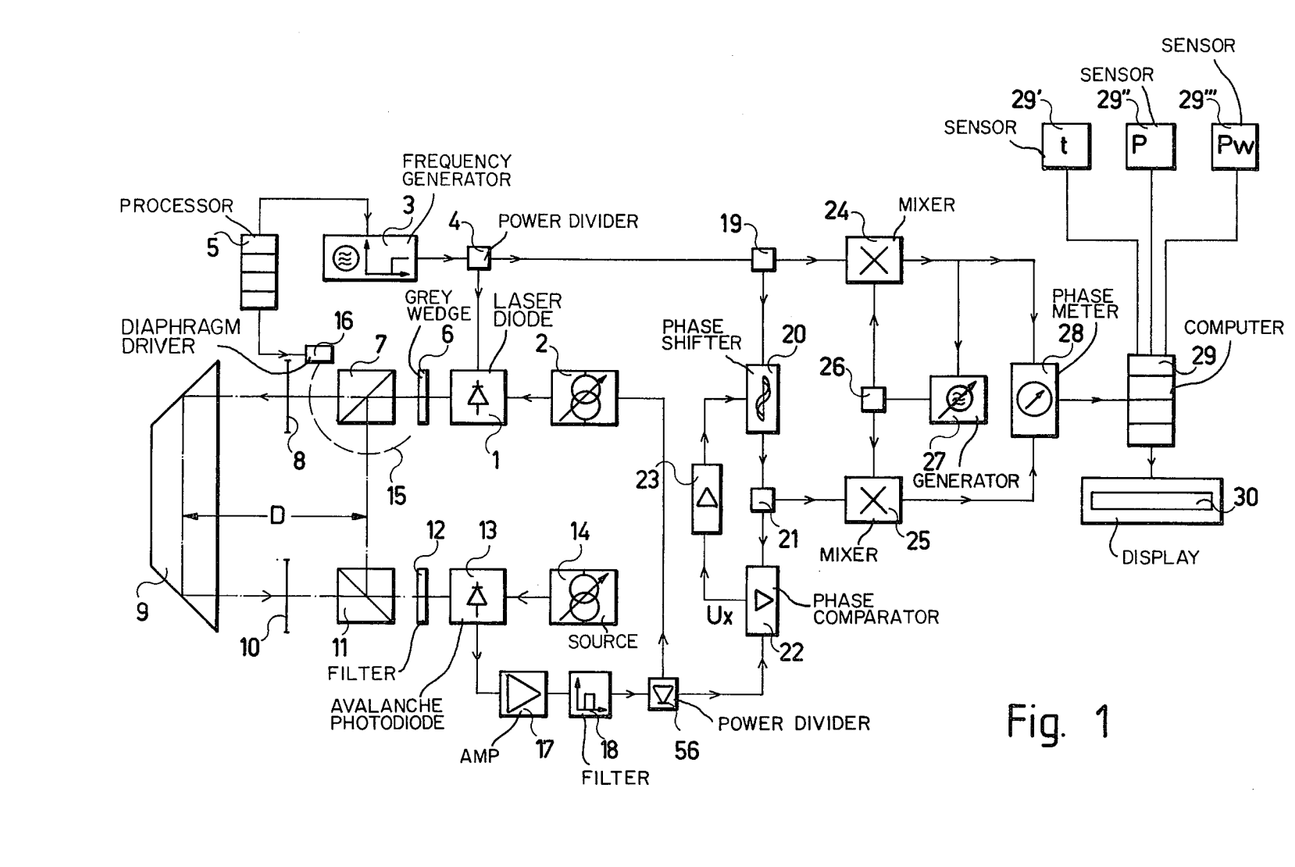
FIG. 1 illustrates a block diagram of an embodiment of apparatus for electrooptical distance measurement according to the invention.

A Gallium Arsenide laser diode 1 is illustrated in FIG. 1 for transmitting light. This diode 1 is supplied with a DC bias current by a controlled DC source 2, and with a modulation signal by a measurement frequency generator 3 connected in parallel via a 1:1 power divider 4. The frequency generator 3 comprises a frequency synthesizer regulated by a processor 5. From the output of the synthesizer the 3rd harmonic is selected by a filter and used as measurement frequency. Thus the 820 nm infrared light transmitted by laser diode 1 is amplitude modulated and directed via a grey wedge 6, a beam dividing prism 7 and a transmitting lens 8 on to the measured distance which is shown to have a length D.

At the other end of the measured distance there is arranged a reflector 9 for laterally displacing the transmitted beam and for directing it back along its first path. After a second pass over the distance D the beam is focussed by a receiving lens 10 through a second beam dividing prism 11 and an interference filter 12 for 820 nm on to a receiver Silica-avalanche photodiode 13. This diode 13 is supplied with a DC bias voltage of about −150 V by an adjustable source 14.

Between the dividing prisms 7 and 11 a part of the light from diode 1 may take an optical short path directly on to the receiver diode 13. An optical switching diaphragm 15 is commanded by processor 5 by means of a driver 16 to open and close the optical measurement path and the short path in an alternative way. Thus the apparatus may be calibrated by a short path measurement, yielding the distance D as one half of the difference of the optical paths between the dividing points of prisms 7 and 11 via reflector 9 and via the short path.

The modulation signal of transmitting diode 1 is found in the output of receiver diode 13 with a phase shift corresponding to the path of length 2 D traversed by the received light beam. This phase shifted output signal of diode 13 passes a microwave amplifier 17 and a band pass filter 18 to suppress any interfering noise components. The clean signal is divided at a power detector 56 for regulating the DC source 2 according to received signal strength. For phase measurement the received measurement signal and the reference signal are provided respectively from power dividers 56 and 4.

The reference signal is directed to a phase comparator 22 via a third power divider 19, an electronic phase shifter 20 and a fourth power divider 21, whereas the second input of comparator 22 is the measurement signal from power divider 56. The output of phase comparator 22 is proportional to the input phase difference minus 90°. This output is connected to the command input of phase shifter 20 via a control unit 23. Due to the effect of the phase control loop 20, 22, 23 the reference signals at power dividers 19 and 21 have a phase difference of which the deviation to 90° is proportional to the distance times two, 2 D.

Said two reference signals are heterodyned with the output of an auxiliary microwave generator 27 for frequency conversion to a lower intermediate frequency. The output of generator 27 is branched by a power divider 26 upon two mixers 24 and 25 for conversion. The phase shift of the mixer outputs corresponds to the phase difference of their inputs. This shift is measured by means of a phase meter 28 which transfers the results for digital storage to a computer means 29. The measured distance is computed by the computer means 29 from the phase differences which accumulate during program control of the measurement frequencies of generator 3 and the optical paths at diaphragm driver 16 by means of processor 5. A display 30 is provided for the result of distance measurement. Data for air temperature t, air pressure p and partial water pressure $p_w$ provided by sensors 29', 29'', 29''' are likewise taken into account by this computing step.

The method of compensating phase shifts by shifting the reference signal by means of the phase shifter 20 according to the invention has proven to be particularly advantageous as an elevated precision of measurement is achieved by averaging, in spite of variations in amplitude and phase of the received light beam due to strong fluctuations of the refractive index of the air along the measured path. The reference signal at power divider 21 is of equal frequency as the measurement signal at the output of band pass filter 18, but its amplitude is constant, whereas the amplitude of the measurement signal is not. This facilitates phase determination as this reference signal is phase shifted by the control loop 20, 22 and 23 until a zero output is detected at phase comparator 22. The necessary phase shift gives a direct indication of the phase difference between measurement signal and reference signal.

The output voltage $u_x$ of phase comparator 22 is proportional to the amplitudes a and b and to the cosine of the phase difference $\phi$ of its input signals:

$$u_x = a \cdot b \cdot \cos \phi.$$

The reference signal is phase shifted by the phase shifter 20 until $\cos \phi = 0$. Then the output of phase comparator 22 is zero millivolt and independent of amplitude variations of the measurement signal. The phase difference between reference and measurement wave at the inputs of phase detector 22 is ±90° in this case.

For a good measurement precision both measurement and reference signals must reach the input of phase comparator 22 with minimum of distortion and interference. This object is achieved according to the invention, as the phase comparator 22 and the electronic phase shifter 20 are connected in series directly via power divider 21. Phase measurement is less critical and therefore effected after frequency conversion by the mixers 24 and 25. In contrast thereto, with the device known from A. W. Kondraschkow (see the above reference) phase comparator and phase shifter are connected after the frequency mixers in such a way that phase comparison is impaired by distortions from mixers and phase shifter.

Power consumption of the laser diode 1 from high frequency oscillator 3 is rather constant but too low to produce a usable optical laser output. Therefore a DC bias current is provided by the DC source 2. In order to achieve a long laser lifetime the bias current is controlled to a minimum in dependence of the receiver signal strength obtained from the power detector 56 (type Wavetek M 151). No phase jumps have been observed in the optical output of laser diode 1 within measurement times of some seconds. So the frequency spectrum of phase fluctuations of laser diode 1 contains only high frequency components but none of low frequency. This holds for any point of the laser diode characteristic, i.e. for all constant bias currents I. The phase of optical output changes however rather abruptly with changing current I. The bias current I is therefore maintained constant during each distance measurement period, according to the invention.

The control circuit for the laserdiode 1 bias is effective in such a way as to increase the bias current I automatically until the mean signal amplitude in the receiver channel 18 has reached its level necessary for distance measurement, the avalanche receiver diode 13 bias voltage having been adjusted before. After this adjustment of the laser bias current I, a hold stage comprised in the current source 2 is put into effect, thus keeping constant the adjusted current level I during the respective measurement period. At long measurement distances the receiver signal may remain weak in spite of a laser bias current I increasing far beyond the laser threshold. To avoid laser damage in such cases the maximum current I is limited by a series resistance to about 6/5 of the laser threshold current.

If a meter is provided for the laser bias current I, pointing the optical measurement beam to the reflector 9, may be done conveniently by adjusting the pointing direction to a minimum value of I before the hold stage is put into effect.

When reference measurements via the optical short path between the beam dividers 7 and 11 are made, the receiver signal level must be reduced, preferably to its value during measurement of the distance, by adjusting the optical grey wedge 6 to the proper S-meter value.

The multiplication M of the avalanche receiver diode 13 is adjusted by the DC-bias voltage at the variable source 14. For small M the noise of the input amplifier 17 by far exceeds the noise generated by diode 13. With increasing M however, the diode 13 noise increases at a greater rate than the usable output signal. The diode 13 multiplication M therefore, is adjusted by increasing the bias voltage at source 14 until the effective noise voltage from diode 13 at the output of amplifier 17 is equal to the effective noise voltage of amplifier 17 itself. The working bias voltage is then adjusted to approximately 0.93 times its value reached by the foregone operation. As the phase difference between the optical input and electrical output signal of avalanche diode 13 is strongly dependent on its multiplication M, M must be held sufficiently constant during each measurement cycle. Moreover M must be limited to about 150 (corresponding to a bias voltage $-U \leq 165$ Volt). For greater values of M unavoidable fluctuations of the optical input signal strength likewise create phase fluctuations of the measurement signal and therefore untolerable distance errors.

These conditions are taken care of by the invention by a control system within the source 14. At the begin of a measurement and without receiving an optical signal this control automatically increases and then reduces the diode 13 bias voltage until the ratio of effective noise voltages of diode 13 and amplifier 17 is as mentioned above. Then another hold stage is put into effect for holding the adjusted multiplication M during the respective measurement. This process is repeated at the begin of each new measurement in order to ensure always the same working conditions.

Certain temperatures have proven to cause too low overall amplification for the whole range of measurement frequencies with a diode 13 multiplication M adjusted as described above. This is because diode 13 amplification has a temperature dependent frequency characteristic. According to the invention this defect is eliminated by a temperature sensitive source 14 for temperature dependent adjustment of the diode 13 bias voltage.

Figure 2:
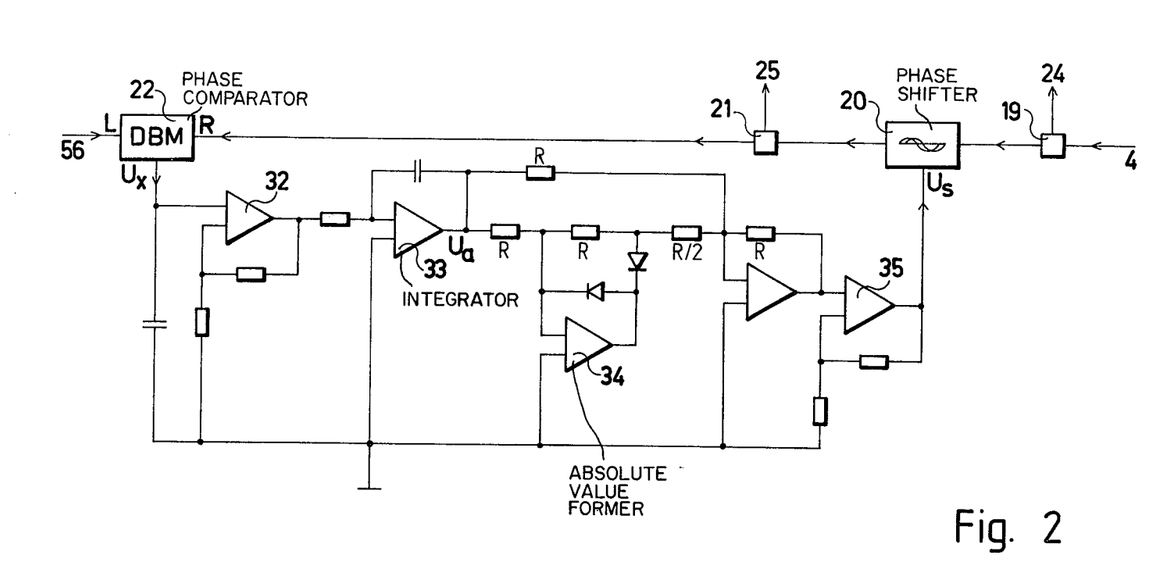
FIG. 2 illustrates a control for an electronic phase-shifter as in FIG. 1.

In FIG. 2 the control loop for the electronic phase shifter 20 as shown in FIG. 1 is illustrated in detail. The phase comparator 22 is a double balanced ring mixer (DBM) as known from CH Patent 596 559. Such a mixer has an input L-port and R-port and an output x-port. With an L-port signal $$u_L = a \cdot \sin \omega t$$

and an R-port signal $$u_R = b \cdot \sin (\omega t + \theta)$$

the x-port output is $$u_x = e + (a \cdot b) \cos \theta,$$

e denoting a zero offset characteristic for the particular mixer element. This offset is compensated by the offset compensation of the following amplifier. For a well adjusted control loop the amplitudes a and b as well as variations thereof are without effect, as $\theta = 90°$, i.e. cos $\theta = 0$. Thus amplitude variations of the measurement signal at the L-port input are compensated. The x-port output $u_x$ of mixer 22 is employed via a DC amplifier 32 to adjust the electronic phase shifter 20 until $u_x = 0$.

Known electronic phase shifters for a frequency range up to 500 MHz (e.g. Merrimac type EPSF-3E-455) are constructed with varactor diodes and hybrid transformers. They need a regulating input voltage $u_s$ range 0 to +20 V. This regulating voltage $u_s$, however, cannot be used as a measure for the effected phase shift as this shift is temperature dependent (typical is ±1 degree/10° C.).

An integrator 33 connected after DC amplifier 32 receives voltage $u_x$ at its input. Thus the integrator 33 output $u_a$ increases until $u_x = 0$. Voltage $u_a$ may be positive or negative. Therefore a stage 34 for forming the absolute value $|u_a|$ is connected after integrator 33 to match voltage $u_a$ to the range of regulating voltage $u_s$ of phase shifter 20. Another amplifier 35 with an amplification factor $V \approx 2$ connected after stage 34 provides the regulating input $$u_s = V \cdot |u_a|.$$

Figure 3:
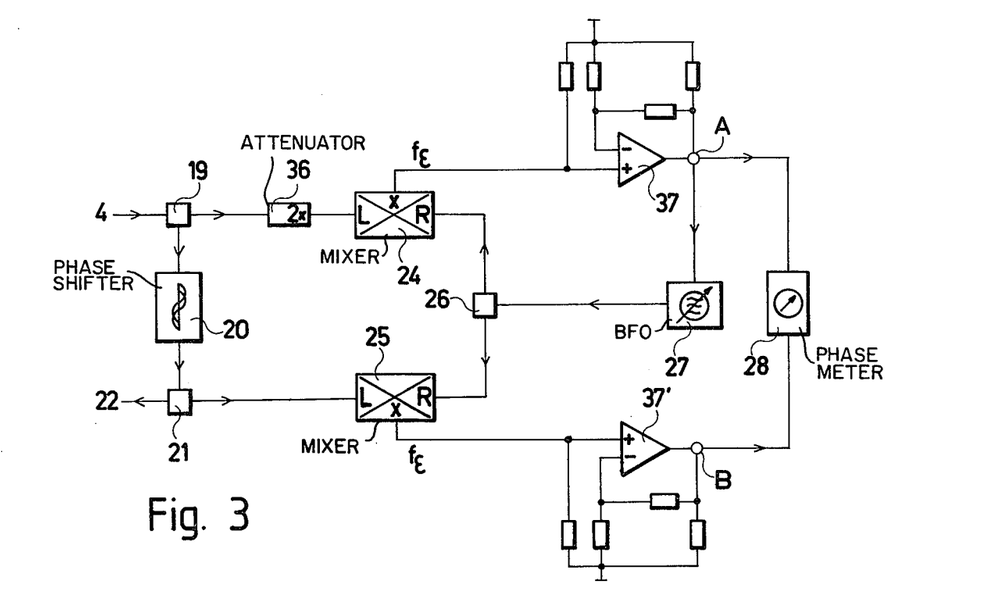
FIG. 3 shows a circuit diagram for phase measurement of the phase shifted reference signal.

FIG. 3 shows in detail the phase measuring circuit 24 to 28 for the phase shifted reference signal. At both the input and output of phase shifter 20 harmonic sine signals are available for determining their phase shift. Therefor these signals are frequency converted (to below 1 MHz) without alteration of their phase relation. This is done, according to the invention, by means of two double balanced ring mixers 24 and 25 for frequency mixing. In order to equalize signal power at the L- and R-inputs of mixers 24 and 25, a 2x-attenuator 36 is provided for the reference signal coming in from frequency generator 3. Only the lower intermediate frequency $f_\epsilon$ at the x-outputs of mixers 24, 25 is used for further processing, the high frequency sum signals likewise appearing, are completely suppressed by the following low frequency stages 37, 37'.

With reference signals at the L-inputs of mixers 24, 25 of frequency f, the beat frequency oscillator (BFO) 27 must generate a frequency $f - f_\epsilon$. This must be a spectrally clean signal without parasitic frequencies. According to the invention therefore, oscillator 27 must work independently of generator 3. Frequency $f - f_\epsilon$ is selected to give an intermediate frequency $f_\epsilon$ between 100 kHz and 200 kHz.

For automatic control of the frequency $f_\epsilon$ a voltage controlled oscillator 27 (VCO) is used. The phase difference of signals of frequency $f_\epsilon$ may be measured by any conventional components 28 which have a phase range >180° and an absolute precision of 0.36 degrees (relative appr. 1‰) at the intermediate frequency $f_\epsilon$ (100 to 200 kHz).

The mixers 24, 25 deliver intermediate frequency signals with amplitudes of about 0.15 $V_{pp}$ each. These are amplified about 15 times by circuits 37 and 37', which are constructed in symmetry to avoid temperature effects. The amplified output signals at points A, B are connected to the phase meter 28.

Figure 4:
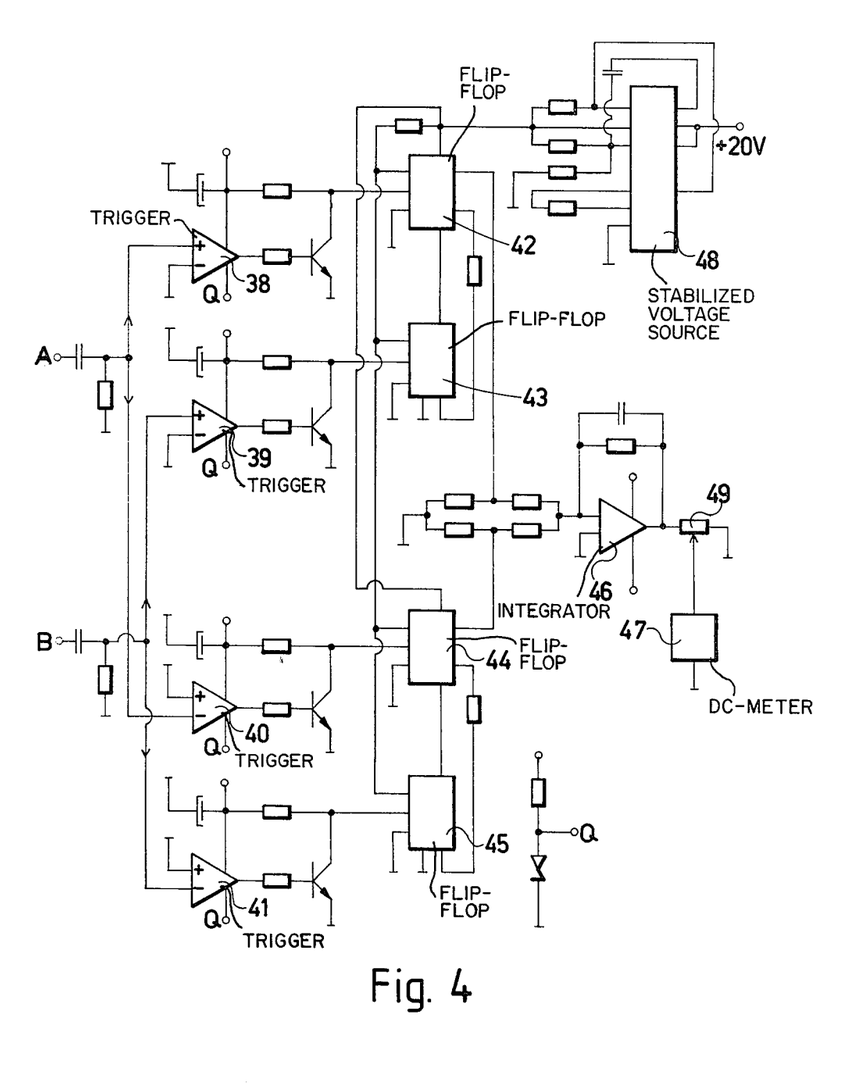
FIG. 4 is a detailed diagram of the phase meter circuit as shown in FIG. 3.

A detailed scheme of a phase meter 28 is disclosed in FIG. 4. The input signals from points A, B are square shaped by triggers 38, 39, 40, 41 with zero reference. Triggers 38, 40 and 39, 41 give square signals of respectively opposite sign. A pair of switching stages 42, 43 and 44, 45 respectively converts each pair of square signals of equal sign into a series of constant amplitude pulses of which the variable pulse widths correspond to the mutual phase shift of input signals at points A, B. A phase difference of 360 degrees corresponds to a pulse duty ratio of 100%.

Both series of pulses are summed and the sum series is converted by an integrator 46 into a DC voltage, which is proportional to the phase difference and may be read from a digital meter 47.

Two channels 38, 39, 42, 43 and 40, 41, 44, 45 are provided for generating the variable width pulse series in order to compensate small DC voltage offsets of the input signals A, B, which otherwise would cause errors in phase measurement. The output of the first channel is alternately switched on and off by stages 42 and 43 respectively by each positive going transition of the input square series, and the output of the second channel likewise by stages 44 and 45. If now the signal A has a small positive DC offset with respect to signal B, the output pulses of the first channel are switched on early and are consequently too long. But the output pulses of the second channel are switched on too late by the same time and therefore are too short by the same amount. As integrator 46 sums the pulse series with equal sense the input offset drops out.

To avoid a temperature drift the pulse heights in stages 42, 43, 44 and 45 are limited by a stabilized voltage source 48 (type SN 72 723).

Integrator 46 is a low-drift-IC (type BB 3510) and the resistors and capacitor with an effect on it are likewise low drift types. A potentiometer 49 at the output of integrator 46 may be used to select a voltage level (e.g. −5 V) to correspond to a phase shift of 180° of the input signals A and B.

Figure 5:
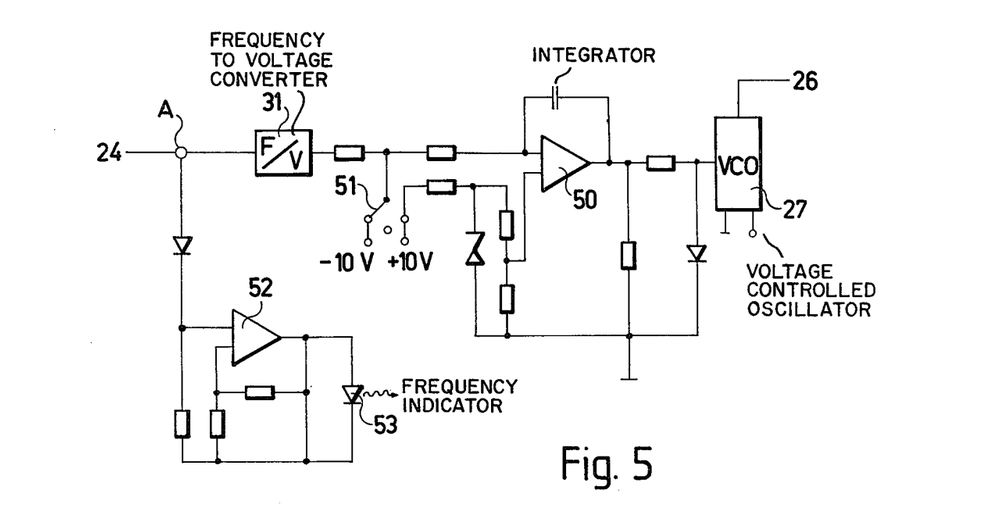
FIG. 5 illustrates a control circuit for intermediate frequency.

A control circuit for the intermediate frequency of signals A, B as illustrated in FIG. 5 generates the regulating voltage for the voltage controlled beat frequency oscillator 27. The intermediate frequency signal at point A is converted into a DC signal by a frequency to voltage converter 31 (F/V). The output of converter 31 is employed by an integrator 50 to generate the regulating voltage for oscillator 27. A coarse frequency adjustment is done by means of a bipolar current source with a selector 51 and an indicating circuit 52. Selector 51 is set by hand until a photodiode 53 of circuit 52 indicates a signal A, frequency below 500 kHz. Then fine adjustment by integrator 50 becomes effective.

Various modifications, changes and embodiments of the invention have been suggested, others may be obvious to those skilled in the art. The number of measurement frequencies selected by processor 5 is given by the maximum measured distance and the necessary distance resolution in order to avoid ambiguities. This disclosure is therefore to be taken as illustrative of the present invention and not limiting thereof.

| Ref. No. | Function | Manufacturer | Catalog No. |
|---|---|---|---|
| | List of standard or commercial items of suitable electronic components which may be used in the distance meter | | |
| 1 | Al—Ga—As laser diode | RCA | C 86000 E |
| 2 | DC current-source, comprising Amplifier | RCA | CA 3140 |
| | Transistor | Texas Instruments | BD 240 |
| 3 | Measurement frequency generator, comp. | | |
| | - Synthesizer | Syntest | SI 160 |
| | - Amplifier | Optimax | AGL 1005 |
| | - Filter | Texscan | 4BC 475 |
| 4, 19, 21, 26 | 1:1 Power Divider | Vari-L | CD-3 |
| 5 | Processor | Intel | 8086 |
| 13 | Avalanche receiver diode | AEG | BPW 28 |
| 14 | DC Voltage source, comp. | | |
| | - HV-Module | Gardner | 100.609 |
| | - Temp. Sensor | NS | LM 334 |
| 17 | Microwave-Amplifier | Optimax | AGL 4018 |
| 18 | Filter | Texscan | 4BC 475 |
| 56 | Power Detector Diode | Wavetek | M 151 |
| 20 | Phase shifter | Merrimac | EPSF-3E-475 |
| 22 | Phase comparator | Cimarron | CM1 |
| 23 | Phase control Unit comp. Amplifiers | RCA, Burr-Brown | CA3140, RB3510 |
| 27 | Voltage controlled oscillator | EMF-Systems | VTN-1A |
| 24, 25 | frequency mixers | Cimarron | CM1 |
| 28 | Phase meter, comp. Ref. No. 38-49 | | |
| 29 | Distance computer | Intel | 8086 |
| 31 | F/V converter | Teledyne Philbrick | 4706 |
| 32 | Amplifier | Burr-Brown | BB 3510 |
| 33 | Integrator | Texas Instruments | SN 72324 |
| 34 | Absolute Amplifier | Texas Instruments | SN 72324 |
| 35 | Amplifier | Texas Instruments | SN 72324 |
| 36 | Attenuator | Huber + Suhner | 3dB |
| 37', 37 | Low frequency Amplifier | Burr-Brown | BB 3510 |
| 38, 39, 40, 41 | Voltage comparators | National Semiconductors | LM 710 |
| 42, 43, 44, 45 | Dual Flip Flop | Texas Instruments | CD 4013 |
| 46 | Integrator | Burr-Brown | BB 3510 |
| 47 | Digital Voltmeter | Data Precision | 245 |
| 48 | Stabilized power source | Texas Instruments | SN 72723 |
| 50 | Integrator | Burr-Brown | BB 3510 |
| 52 | Indication amplifier | RCA | CA 3140 |

-continued

| | List of standard or commercial items of suitable electronic components which may be used in the distance meter | | |
|---|---|---|---|
| Ref. No. | Function | Manufacturer | Catalog No. |
| 53 | Light emitting diode | Fairchild | FLV 104 |

What is claimed is:

1. A method for electrooptical distance measurement, whereby a beam of modulated light is transmitted over the distance and after reception is converted into an electrical signal corresponding to the modulation of light, said signal being compared with respect to time with reference signal used for modulating the light beam, at least one of said signals being shifted with respect to the other one until a given time relation between the signals is reached, and the distance being found from the extent of said signal shift, comprising the steps
   (a) mixing for temporal comparison the signal converted from the modulated light and the reference signal used for modulating the light beam,
   (b) time-shifting the reference signal by means of a control circuit and a driving signal obtained from said mixing step, until a given time relation with respect to the converted signal is reached,
   (c) frequency converting to a lower frequency the shifted as well as the unshifted reference signals, and
   (d) measuring the temporal difference of the frequency-converted reference signals to determine the temporal shift of the reference signal obtained in said time-shifting step.

2. A method as claimed in claim 1, wherein from the strength of the received modulated light a regulating signal is derived for regulating, by means of a control circuit (2), the strength of the transmitted modulated light in such a way that the strength of the received light is convenient for signal processing.

3. An apparatus for electrooptical distance measurement with a means for transmitting continuously modulated light, a receiving means for converting said modulated light into an electrical signal corresponding to the modulation of light, as well as a means for comparing, with respect to time, said converted signal with a reference signal used for modulating said light transmitting means, means for changing by a measurable amount the temporal shift between said converted signal and reference signal including means for obtaining the distance from said measured temporal signal shift, the apparatus comprising a first double balanced mixer (22) for temporal comparison of converted signal and reference signal, an electronic phase shifter (20) for time-shifting the reference signal, a local oscillator (27) and two double balanced mixers (24, 25) for frequency-converting respectively the shifted and the unshifted reference signals, as well as a phase meter (28) for the frequency-converted reference signals.

4. An apparatus as claimed in claim 3, comprising a control circuit (20, 22, 23) wherein the electronic phase shifter (20) is driven by the output of the first double balanced mixer (22).

5. An apparatus as claimed in claim 3, comprising an optical means (6 to 12) for directing the modulated light from the transmitting means (1) over the distance to the receiving means (13), an optical means (6, 7, 11, 12) for directing the modulated light from the transmitting means (1) over a known reference distance to the receiving means (13), and an optical switching means (15, 16) for respectively opening and closing the measured distance and the reference distance alternately.

6. An apparatus as claimed in claim 3, with the receiving means comprising a silica-avalanche-photodiode (13) and a temperature sensing means (14) for generating a diode bias voltage depending on temperature.

7. An apparatus as claimed in claim 3, with the receiving means comprising a silica-avalanche-photodiode (13) and a control means (14) for regulating a diode bias voltage in order to maintain a given amount of intrinsic noise in the diode output.

8. An apparatus as claimed in claim 3, with the transmitting means comprising a laser diode (1) as well as a means (2) for stabilizing, limiting and regulating in dependence on temperature the DC bias current of the laser diode (1).

9. An apparatus as claimed in claim 8, comprising a power detector (56) for the received modulated light and a sample-hold stage switched to the power detector for regulating the DC bias current of the laser diode (1).

10. An apparatus as claimed in claim 4, wherein the control circuit (20, 22, 23) comprises an integrator (33) switched to the output of the first double balanced mixer (22) and a means (34) for forming the absolute value of the integrated signal in order to match it to the regulating range of the electronic phase shifter (20).

11. An apparatus as claimed in claim 8, comprising an interference filter (12) arranged in the optical ray path in front of the receiving means (13) and matched to the spectral width of the laser diode (1).

12. An apparatus as claimed in claim 3, comprising a grey wedge (6) arranged in the optical ray path in front of the transmitting means (1) for setting a convenient optical signal strength for the receiving means (13).

13. An apparatus as claimed in claim 3, comprising a frequency synthesizer (3) and a filter network selecting from the output of the synthesizer a harmonic component with respect to the fundamental frequency for modulating the transmitting means (1).

14. An apparatus as claimed in claim 13, wherein the frequency synthesizer (3) and the filter network may produce each one of a series of different modulating frequencies within the microwave range.

15. An apparatus as claimed in claim 14, wherein said local oscillator (27) for frequency converting is controlled and arranged within a controlling loop in such a way that for each modulating frequency the frequency-converted reference signals all have one and the same frequency.

16. An apparatus as claimed in claim 14, wherein said means for obtaining the distance comprise a processor means (29) for computing the distance from the output of said phase meter (28) for the series of modulating frequencies and from measured data of temperature, air pressure and partial water pressure.

17. An apparatus as claimed in claim 5 or 14 or 16, wherein said means (5, 29) for obtaining the distance may be used to direct the modulated light over the known optical reference path by means of the optical switching means (15, 16), to set a modulating frequency by means of the frequency synthesizer (3), to register the time-shift between converted signal and reference signal by means of the phase meter (28), to repeat this process for the optical measurement path and for both reference and measurement paths for the remaining modulating frequencies, and to compute the distance from the registered time-shifts by means of the processor means (29).

* * * * *